United States Patent [19]

Drenner

[11] Patent Number: 4,520,568
[45] Date of Patent: Jun. 4, 1985

[54] BRAKE DRUM GAUGE
[75] Inventor: Dewey A. Drenner, Glen Burnie, Md.
[73] Assignee: 4D Incorporated, Baltimore, Md.
[21] Appl. No.: 593,922
[22] Filed: Mar. 27, 1984
[51] Int. Cl.³ .............................. G01B 5/12; G01B 3/22
[52] U.S. Cl. ................................ 33/143 R; 33/147 K; 33/178 R; 33/181 AT
[58] Field of Search ............. 33/143 R, 147 R, 147 K, 33/181 AT, 178 R

[56] References Cited

U.S. PATENT DOCUMENTS

| | | | |
|---|---|---|---|
| 23,564 | 4/1859 | Gould | 33/147 R |
| 2,112,252 | 3/1938 | Sang | 33/147 R X |
| 2,303,858 | 12/1942 | Ostberg | 33/147 |
| 2,524,256 | 10/1950 | Greany | 33/147 |
| 2,648,134 | 8/1953 | Billeter | 33/147 |
| 2,769,241 | 11/1956 | Barrett | 33/147 |
| 2,873,533 | 2/1959 | Wilson | 33/147 |
| 2,938,272 | 5/1960 | Conklin | 33/147 |
| 3,006,076 | 10/1961 | Wisti | 33/178 |
| 3,192,634 | 7/1965 | Johnson | 33/147 |
| 3,507,048 | 4/1970 | Owens | 33/178 |
| 3,745,661 | 7/1973 | Atzberger | 33/147 |
| 3,827,153 | 8/1974 | Mitchell | 33/178 |
| 3,889,378 | 6/1975 | Senecal | 33/143 |
| 3,995,374 | 12/1976 | Fisk | 33/178 R |
| 4,353,168 | 10/1982 | Ginggen | 33/147 |

FOREIGN PATENT DOCUMENTS

| | | | |
|---|---|---|---|
| 957792 | 2/1957 | Fed. Rep. of Germany | 33/147 K |
| 971605 | 8/1950 | France | 33/147 K |
| 584526 | 1/1947 | United Kingdom | 33/147 K |

Primary Examiner—Robert S. Ward
Attorney, Agent, or Firm—Shapiro and Shapiro

[57] ABSTRACT

A brake drum gauge comprises a U-shaped frame with a pair of supports attached to its ends so the gauge may rest on the rim of a brake drum. A micrometer having an outwardly biased actuating pin is attached to one end of the frame, and a reference pin is attached to the other end thereof. The reference pin and micrometer actuating pin engage the inner surface of the brake drum at diametrically opposite points, the micrometer thereby indicating the diameter of the drum relative to its prescribed nominal diameter. The reference pin and support attached to the same end of the frame may be elements of a set of interchangeable pins and corresponding supports, whereby the gauge may be selectively fitted to measure brake drums of different sizes.

14 Claims, 9 Drawing Figures

BRAKE DRUM GAUGE

BACKGROUND OF THE INVENTION

This invention relates to equipment for maintaining vehicular brake drums and is more particularly concerned with a gauge for measuring brake drum internal diameters.

In order to ensure proper performance of drumtype brake systems, brake drums which are out of round or which are of a diameter not within prescribed tolerances must be detected and either repaired or replaced. Such brake drum conditions are ordinarily detected by the use of a brake drum gauge, a class of device which is well known. Because brake drums are manufactured over a range of nominal diameters, it is usually desirable in practice that a brake drum gauge have the capability to measure drums of different sizes. Also, it is frequently desirable that a gauge of this type be applicable to brake drums in situ on the axle spindle of a vehicle or the mandrel of a repair shop turning lathe (used, for example, to recondition drums that are out of round) to avoid costly labor associated with removing and remounting the drums. Various gauges having one or both of the aforesaid characteristics have been proposed in the prior art. Generally, however, such devices have been beset with one or more of a number of problems such as high cost, complexity, difficulty in use, and excessive delicacy. Moreover, these devices have often required special micrometers, a factor which has contributed to the foregoing problems.

SUMMARY OF THE INVENTION

In contrast to the prior art, the present invention provides a brake drum gauge of simple, rugged construction which offers the desirable characteristics noted above and which is both inexpensive and easy to use. In addition, as will be addressed more fully hereinafter, a brake drum gauge according to the present invention need not include a special micrometer, but instead may incorporate an ordinary circular dial micrometer.

More particularly, in accordance with one of its broad aspects, the invention provides a brake drum gauge comprising a frame having a first end and a second end, the first end having attached thereto a support adapted to rest on the rim of a brake drum and a micrometer including an outwardly biased reciprocative actuating pin with a free end adapted to engage the inner surface of the brake drum, the second end having removably attached thereto an additional support adapted to rest on the rim of the brake drum substantially opposite the first-mentioned support and a reference pin with a free end adapted to engage the inner surface of the brake drum at a point diametrically opposite the free end of the actuating pin. The reference pin and additional support constitute elements of a set including a plurality of reference pins and corresponding additional supports adapted for removable attachment to the second end of the frame, each reference pin having a free end adapted for engagement with the inner surface of a brake drum of corresponding prescribed nominal diameter when attached to the second end, the additional support corresponding to that pin being adapted to rest on the rim of the same brake drum when attached to the second end.

According to another broad aspect of the invention, a brake drum gauge is provided which comprises a U-shaped frame having a first end and a second end separated at a fixed distance, a first support and a second support attached respectively to those ends, the supports extending outwardly relative to the respective ends and being adapted to rest on substantially opposite portions of the rim of a brake drum, a reference pin attached to the second end and having a free end projecting outwardly relative to that end for engagement with the inner surface of the brake drum, and a micrometer attached to the first end, the micrometer including an outwardly biased reciprocative actuating pin with a free end projecting outwardly relative to the first end for engagement with the inner surface of the brake drum at a point diametrically opposite the free end of the reference pin.

The various features and advantages of the invention will be more fully understood from the description of the preferred embodiment hereinafter in which reference is had to the accompanying drawings.

DETAILED DESCRIPTION OF THE PREFERRED EMBODIMENT

Figure 1:
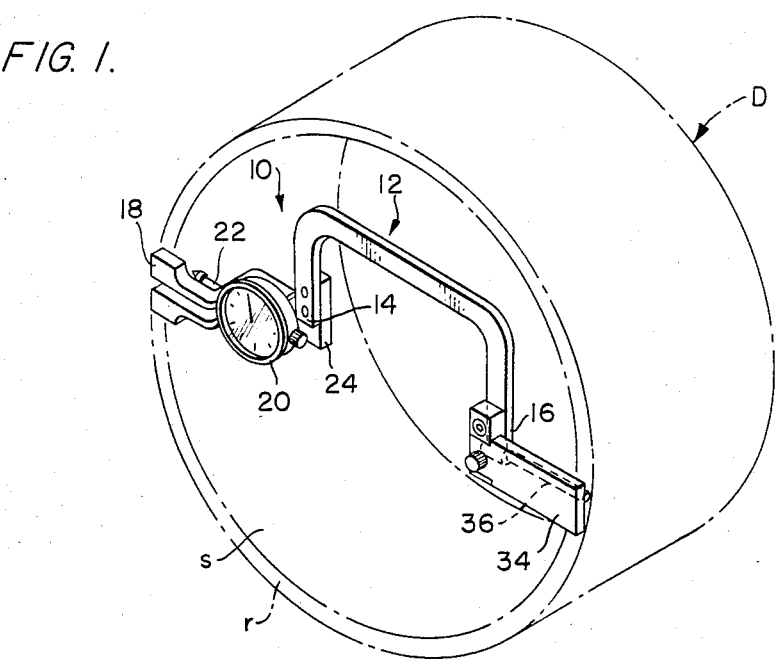
FIG. 1 is a perspective view of a brake drum gauge in accordance with the invention shown in position for measuring a brake drum, the brake drum being shown diagrammatically.

With reference initially to FIG. 1, a preferred embodiment of a brake drum gauge 10 in accordance with the invention is shown in operative position for measuring the internal diameter of a vehicular brake drum D. Brake drum D (shown diagrammatically for the purposes hereof) is of the usual configuration, having a rim r and an inner surface s adapted to be engaged by a set of brake shoes (not shown) disposed internally thereof.

Figure 2:
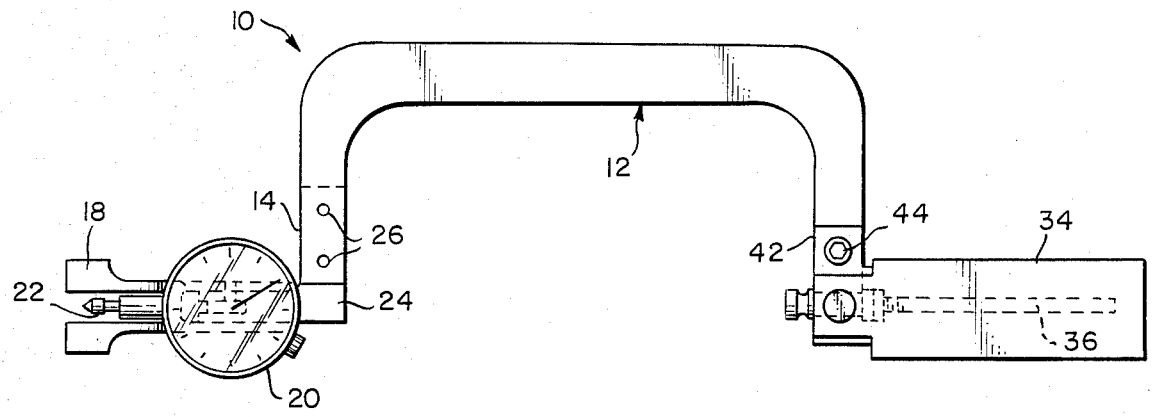
FIG. 2 is a top plan view of the brake drum gauge.
Figure 3:
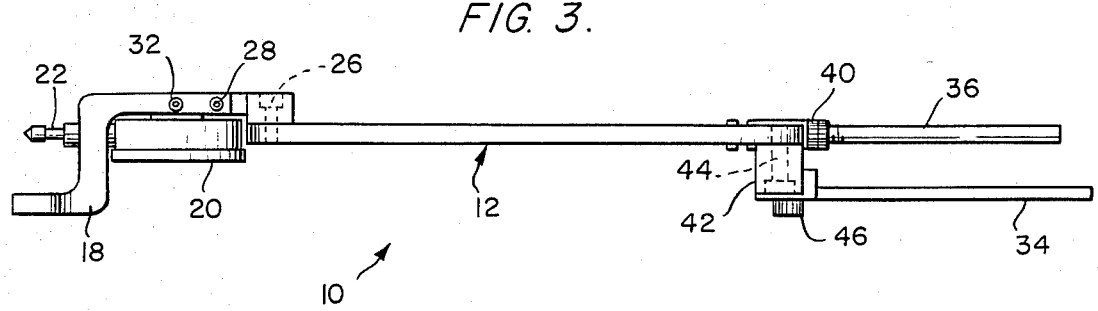
FIG. 3 is a side elevation view of the brake drum gauge.

Referring to FIGS. 1–3, brake drum gauge 10 comprises a frame 12 having first and second ends 14 and 16, respectively. In the form shown, frame 12 comprises a flat, U-shaped bar with ends 14 and 16 separated at a fixed distance. The U-shaped configuration of frame 12 offers certain advantages in the use of the brake drum gauge that will be discussed later.

Figure 5:
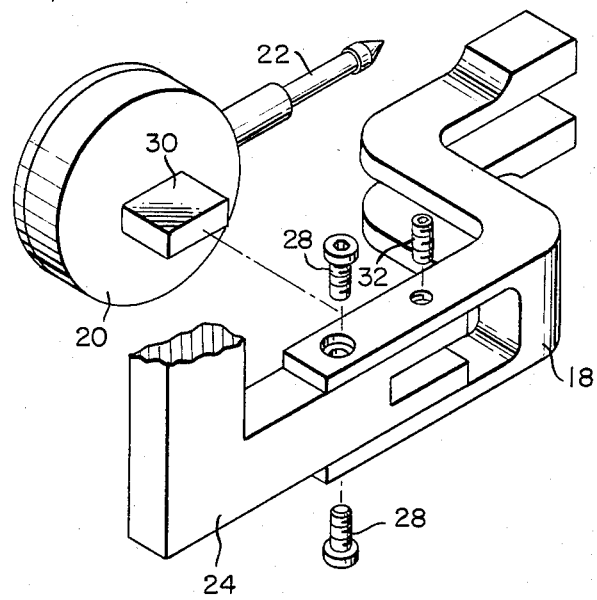
FIG. 5 is a view similar to FIG. 4, illustrating details of the opposite end of the brake drum gauge.

Attached to first end 14 of the frame are a support 18 and a micrometer 20. Support 18, which may be configured as shown in FIG. 5, extends outwardly relative to the first end 14 and, as best seen in FIG. 1, is adapted to rest on rim r of the brake drum D. Micrometer 20 is of the type which includes an outwardly biased reciprocative actuating pin and is preferably a circular dial micrometer having a radially projecting actuating pin 22, as shown. It will be appreciated, of course, that micrometer 20 is designed to provide a "zero" reading on its dial when the free end of actuating pin 22 is located at a corresponding "zero" position. Variations in the position of the free end of the actuating pin from the aforesaid zero position are reflected by corresponding movement of the dial indicator relative to the dial scale (usually graduated in thousandths of an inch). Extension of the pin beyond the zero position yields a plus reading, retraction of the pin yielding a minus reading. As is most readily seen in FIG. 1, micrometer 20 is attached to first end 14 of the frame in an orientation whereby the free end of actuating pin 22 extends outwardly relative to first end 14 for engagement with inner surface s of the brake drum D.

Support 18 and micrometer 20 may be attached to frame 12 by various means, the present embodiment incorporating a right angular mounting bar 24 of the configuration shown in FIGS. 1, 2 and 5. In the illustrated arrangement, one arm of mounting bar 24 is attached to the underside of first end 14 of the frame by a pair of screws 26, support 18 and micrometer 20 being secured to the free arm of the mounting bar in the manner illustrated in FIG. 5. More particularly, support 18 is secured to the lateral portions of the free arm of mounting bar 24 by means of screws 28. The base of micrometer 20 is provided with a boss 30 which is secured by means of a set screw 32 within a split at the end of the free arm of mounting bar 24. (In the assembly shown, set screw 32 also acts to stabilize support 18 on the mounting bar.) Notably, the outward portion of support 18 is bifurcated to accommodate micrometer actuating pin 22, thereby facilitating the attachment of the micrometer to the frame. For reasons which will become apparent hereinafter, it should be noted that micrometer 20 and mounting bar 24 are so arranged that micrometer actuating pin 22 lies substantially in the plane of U-shaped frame 12.

Figure 4:
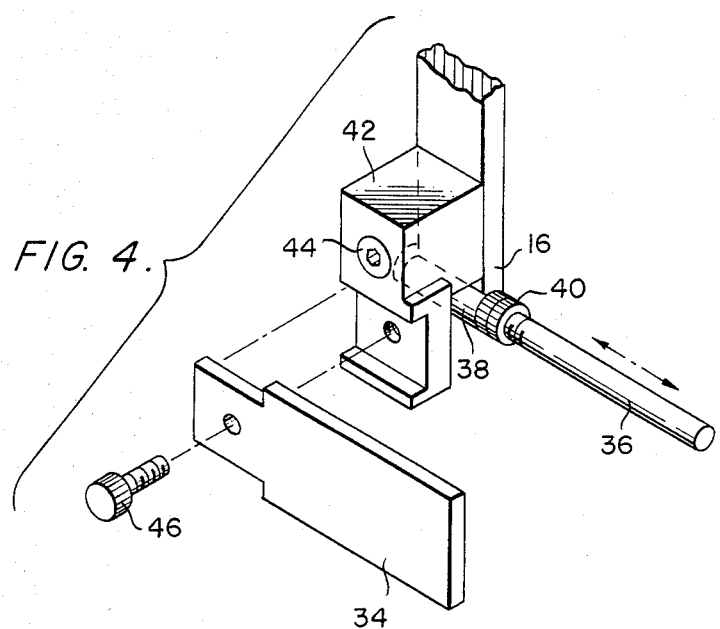
FIG. 4 is a fragmentary perspective view, shown partially exploded, illustrating details of one end of the brake drum gauge.
Figure 6A:
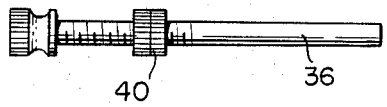
FIG. 6A is a transverse view of a reference pin and lock nut adapted for use with the brake drum gauge.
Figure 6B:
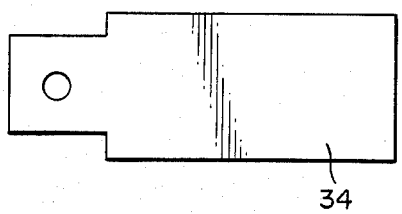
FIG. 6B is a top plan view of a support corresponding to the reference pin of FIG. 6A.

With respect to the second end 16 of frame 12, it will be observed that an additional support 34 and a reference pin 36 are removably attached thereto (see FIG. 4). Additional support 34, which is preferably a flat plate of the configuration shown, for example, in FIG. 4, extends outwardly relative to second end 16 of the frame and is adapted to rest on rim r of the brake drum D substantially opposite support 18 (see FIG. 1). Reference pin 36, which may be of the configuration shown in FIG. 6A, for example, has a free end which projects outwardly from second end 16 for engagement with the brake drum inner surface s at a point diametrically opposite the free end of micrometer actuating pin 22.

FIG. 4 illustrates the manner in which additional support 34 and reference pin 36 are attached to second end 16 of the frame in the present embodiment. As shown therein, second end 16 is provided with a boss 38 having an internal bore through which reference pin 36 is inserted. A portion of reference pin 36 inward of its free end is secured within the bore by threaded means including a lock nut 40 which is cooperable with external threads on the aforesaid portion of the reference pin. The threading of the lock nut 40 in place as shown in FIG. 4 provides a clamping action against boss 38 between the head of the reference pin and lock nut 40. It will be appreciated that when attached to second end 16 of the frame in the manner just described, reference pin 36 is colinear with micrometer actuating pin 22. Also shown in FIG. 4 is a body 42 which is attached to the top side of second end 16 by a screw 44 and which projects out of the plane of the U-shaped frame 12. Body 42 includes a channeled arm in spaced relation to the plane of frame 12, additional support 34 being secured to the arm by means of a screw 46.

It will be appreciated that to permit highly accurate measurement of the actual diameter of brake drum D (at inner surface s), reference pin 36 is formed to a precise length relating to the prescribed nominal diameter of the drum D. More particularly, the length of reference pin 36 is such that the distance between its free end and the free end of micrometer actuating pin 22 equals the prescribed nominal diameter of brake drum D when actuating pin 22 is in its zero position. For example, if brake drum D were a 16" drum (i.e., if brake drum D had a prescribed nominal diameter of 16"), the distance between the free ends of reference pin 36 and actuating pin 22 (in its zero position) would be 16".

To measure the internal diameter of brake drum D, brake drum gauge 10 is placed in operative position on the drum as illustrated in FIG. 1. When so positioned, gauge 10 will be supported at its opposite ends by supports 18 and 34 which rest on rim r of the brake drum. At the same time, the free ends of reference pin 36 and micrometer actuating pin 22 will contact diametrically opposite points of the brake drum inner surface s. Any variation in the actual diameter of drum D from its prescribed nominal diameter will be indicated by micrometer 20, thereby permitting a determination as to whether the diameter of brake drum D is within acceptable tolerances. An out-of-round condition of brake drum D may be determined by rotating gauge 10 in operative position about the axis of the drum. Micrometer actuating pin 22, due to its outward bias, will follow brake drum inner surface s, thereby providing a continuous indication of the actual diameter of the brake drum (relative to the prescribed nominal diameter) as gauge 10 is rotated.

As noted previously, it may be desired to effect measurement of brake drum D while it is in place on its associated vehicle axle spindle or the mandrel of a repair shop turning lathe. It will be apparent that gauge 10 may be applied under such circumstances by virtue of the U-shaped configuration of frame 12. This configuration of the frame permits ends 14 and 16 to straddle an axle spindle or a lathe mandrel when brake drum gauge 10 is located in an operative position as previously described.

Figure 7A:
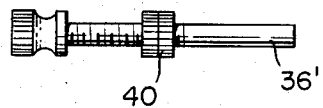
FIGS. 7A and 7B show, respectively, another reference pin with lock nut and a corresponding support.
Figure 7B:
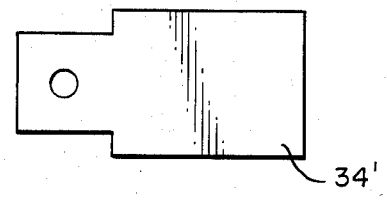

FIGS. 7A and 7B respectively illustrate another reference pin 36' and corresponding additional support 34'. These elements are respectively of configurations similar to those of reference pin 36 and additional support 34 and are likewise adapted for removable attachment to second end 16 of frame 12 in the manner described in connection with FIG. 4. In the form shown, reference pin 36' and additional support 34' are respectively shorter than reference pin 36 and additional support 34 and are thus intended to be incorporated in brake drum gauge 10 for measuring brake drums of smaller prescribed nominal diameter than that of brake drum D. For example, assuming that reference pin 36' and additional support 34' were two inches shorter than their respective counterparts 36 and 34, brake drum gauge 10 could be fitted for measuring brake drums of a corresponding prescribed nominal diameter which is two inches shorter than that of brake drum D by detaching reference pin 36 from frame 12 and attaching reference pin 36' in its place, the supports 34 and 34' also being interchanged. It will thus be appreciated that by utilizing a set of reference pins and corresponding additional supports of various lengths, brake drum gauge 10 may be selectively fitted to measure brake drums over a substantial range of sizes.

While a preferred embodiment of the invention has been shown and described herein, it will be apparent to those skilled in the art that various changes and modifications may be made within the scope of the invention as defined in the appended claims.

I claim:

1. A brake drum gauge comprising a frame having a first end and a second end, said first end having attached thereto a support adapted to rest on the rim of a brake drum and a micrometer including an outwardly biased reciprocative actuating pin with a free end adapted to engage the inner surface of said brake drum, said second end having removably attached thereto an additional support adapted to rest on the rim of said brake drum substantially opposite the first mentioned support and a reference pin with a free end adapted to engage the inner surface of said brake drum at a point diametrically opposite the free end of said actuating pin, said reference pin and additional support being elements of a set including a plurality of reference pins and corresponding additional supports adapted for removable attachment to the second end of said frame, each reference pin having a free end adapted for engagement with the inner surface of a brake drum of corresponding prescribed nominal diameter when that pin is attached to said second end, the additional support corresponding to that pin being adapted to rest on the rim of the same brake drum when attached to said second end.

2. A brake drum gauge as recited in claim 1, wherein said frame comprises a fixed U-shaped bar.

3. A brake drum gauge as recited in claim 1, wherein each of said additional supports comprises a plate.

4. A brake drum gauge as recited in claim 1, wherein each of said reference pins is adapted for attachment to said second end by means of a threaded portion disposed inwardly of its free end.

5. A brake drum gauge as recited in claim 1, wherein said micrometer comprises a circular dial micrometer, said actuating pin projecting radially therefrom.

6. A brake drum gauge as recited in claim 1, wherein the first mentioned support is bifurcated to accommodate said actuating pin for facilitating attachment of said micrometer to said first end.

7. A brake drum gauge comprising a U-shaped frame having a first end and a second end separated at a fixed distance, a first support and a second support attached respectively to said first and second ends, said supports extending outwardly relative to the respective ends and being adapted to rest on substantially opposite portions of the rim of a brake drum, a reference pin attached to said second end, said reference pin having a free end projecting outwardly relative to said second end for engagement with the inner surface of said brake drum, and a micrometer attached to said first end, said micrometer including an outwardly biased reciprocative actuating pin, said actuating pin having a free end projecting outwardly relative to said first end for engagement with the inner surface of said brake drum at a point diametrically opposite the free end of said reference pin.

8. A brake drum gauge as recited in claim 7, wherein said reference pin and said second support constitute elements of a set of reference pins and corresponding supports which are removably attachable to said second end, each reference pin having a free end adapted for engagement with the inner surface of a brake drum of corresponding prescribed nominal diameter when that pin is attached to the second end of said frame, the support corresponding to that pin being adapted to rest on the rim of the same brake drum when attached to said second end.

9. A brake drum gauge as recited in claim 7, wherein said second support comprises a plate.

10. A brake drum gauge as recited in claim 7, wherein said reference pin is attached to said second end by means of a threaded portion disposed inwardly of its free end.

11. A brake drum gauge as recited in claim 7, wherein said first support includes a bifurcated portion adapted to accommodate said actuating pin for facilitating the attachment of said micrometer to the first end of said frame.

12. A brake drum gauge as recited in claim 7, wherein said micrometer comprises a circular dial micrometer, said actuating pin projecting radially therefrom.

13. A brake drum gauge as recited in claim 12, wherein said micrometer includes a base with a boss thereon, said boss being secured to mounting means connected to the first end of said frame.

14. A brake drum gauge as recited in claim 7, wherein said frame lies substantially in a plane and includes at its second end a body projecting out of said plane and a boss having a bore therein, wherein said second support is secured to said body in spaced relation to said plane, and wherein a portion of said reference pin inward of its free end is secured within said bore by threaded means.

* * * * *